United States Patent
Kaneko et al.

(10) Patent No.: US 11,192,738 B2
(45) Date of Patent: Dec. 7, 2021

(54) BILL CONVEYING ROLLER BASE

(71) Applicant: BANDO CHEMICAL INDUSTRIES, LTD., Hyogo (JP)

(72) Inventors: Katsuhiro Kaneko, Hyogo (JP); Shinji Fujiwara, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 278 days.

(21) Appl. No.: 16/467,061

(22) PCT Filed: Dec. 5, 2017

(86) PCT No.: PCT/JP2017/043542
§ 371 (c)(1),
(2) Date: Jun. 6, 2019

(87) PCT Pub. No.: WO2018/105573
PCT Pub. Date: Jun. 14, 2018

(65) Prior Publication Data
US 2019/0359439 A1    Nov. 28, 2019

(30) Foreign Application Priority Data
Dec. 9, 2016   (JP) .............................. JP2016-239338

(51) Int. Cl.
*B65H 27/00* (2006.01)
*B65H 5/06* (2006.01)
(Continued)

(52) U.S. Cl.
CPC ................. *B65H 5/06* (2013.01); *B65H 3/06* (2013.01); *B32B 27/40* (2013.01); *B65H 27/00* (2013.01);
(Continued)

(58) Field of Classification Search
CPC .... B65H 27/00; B65H 2401/111; B65H 5/06; B65H 3/06; B65H 2701/1912
See application file for complete search history.

(56) References Cited

U.S. PATENT DOCUMENTS

2019/0332051 A1*   10/2019   Suzuki ................ C08G 18/758

FOREIGN PATENT DOCUMENTS

| CN | 1654291 | 8/2005 |
|----|---------|--------|
| CN | 101058667 | 10/2007 |

(Continued)

OTHER PUBLICATIONS

"International Search Report (Form PCT/ISA/210) of PCT/JP2017/043542", dated Feb. 27, 2018, with English translation thereof, pp. 1-2.

(Continued)

*Primary Examiner* — Howard J Sanders
(74) *Attorney, Agent, or Firm* — JCIP Global Inc.

(57) ABSTRACT

The present invention addresses the problem of providing a bill conveying roller base having an excellent swelling resistance. In order to solve this problem, the bill conveying roller base is provided with an elastic layer covering at least part of the outer peripheral surface, the elastic layer comprising a thermosetting polyurethane which is obtained by reacting polyol components containing a lactone-based polyol with polyisocyanate components containing methylene diphenyl diisocyanate (MDI).

6 Claims, 1 Drawing Sheet

(51) Int. Cl.
   *B65H 3/06*   (2006.01)
   *B32B 27/40*   (2006.01)
(52) U.S. Cl.
   CPC .............................. *B65H 2401/111* (2013.01);
   *B65H 2701/1912* (2013.01)

(56) References Cited

FOREIGN PATENT DOCUMENTS

| | | |
|---|---|---|
| CN | 101723194 | 6/2010 |
| JP | H115637 | 1/1999 |
| JP | 2002048129 | 2/2002 |
| JP | 2003341859 | 12/2003 |
| JP | 2005-289612 | 10/2005 |
| JP | 2008037524 A * | 2/2008 |
| JP | 2014037007 | 2/2014 |
| JP | 2016041627 | 3/2016 |

OTHER PUBLICATIONS

"International Preliminary Report on Patentability of PCT/JP2017/043542; this report contains the following items :Form PCT/IB/338,PCT/IB/326 (cover sheet), PCT/IB/373(cover sheet), PCT/ISA237(cover sheet), PCT/ISA237(Box No. I),PCT/ISA237(Box No. V)", dated Jun. 20, 2019, which is English translation of "Written Opinion of the International Searching Authority", p. 1-p. 11.

"Office Action of China Counterpart Application", dated Jun. 1, 2020, with English translation thereof, pp. 1-13.

Office Action of China Counterpart Application, with English translation thereof, dated Mar. 19, 2021, pp. 1-10.

* cited by examiner

BILL CONVEYING ROLLER BASE

CROSS-REFERENCE TO RELATED APPLICATION

This application is a 371 application of the international PCT application serial no. PCT/JP2017/043542, filed on Dec. 5, 2017, which claims the priority benefit of Japan application no. 2016-239338, filed on Dec. 9, 2016. The entirety of each of the above-mentioned patent applications is hereby incorporated by reference herein and made a part of this specification.

TECHNICAL FIELD

The present invention relates to a roller base that is used in a bill conveying roller for conveying bills in a bill conveying device for an automated teller machine, an exchange machine, a change machine, a vending machine, a ticket vending machine, a bill counter, or the like.

BACKGROUND ART

For a bill feeding device, bill conveying rollers such as a feed roller, a gate roller, a retard roller, a kicker roller, and a sending roller are used to convey and feed bills one by one. The bill conveying rollers have outer peripheral surfaces, at least a part of which is formed using a rubber material with a large friction coefficient. The bill feeding device can separate and convey the bills one by one and feed an accurate number of bills by utilizing the high frictional force provided on the outer peripheral surfaces of the bill conveying rollers (see Patent Literatures 1 and 2).

Since the bill feeding device is for handling bills with high values, the bill feeding device is required to separate and convey an accurate number of bills, and the bill conveying rollers are required to have high dimensional stability. Here, since the bills are distributed in society as exchange means, the bills may come into contact with and be contaminated by various substances. There are various kinds of contamination which may adhere to the bills, one of main components thereof being human sebum. Also, since the bill conveying rollers are brought into strong contact with bills, oil components contained in the human sebum adhering to the bills may permeate the rubber material, and the rubber material may swell during long-term utilization in some cases. Since the diameter of the bill conveying roller with the swollen rubber material has changed, it may not be possible to precisely separate the bills, and paper jam or taking of several bills together (double feed) may occur.

CITATION LIST

Patent Literature

[Patent Literature 1]
Japanese Unexamined Patent Application Publication No. 2003-341859
[Patent Literature 2]
Japanese Unexamined Patent Application Publication No. 2005-289612

SUMMARY OF INVENTION

Technical Problem

An object of the invention is to provide a bill conveying roller base with an excellent swelling resistance.

Solution to Problem

Means for solving the aforementioned problem is as follows.

1. A bill conveying roller base comprising: an elastic layer covering at least part of the outer peripheral surface, the elastic layer comprising a thermosetting polyurethane which is a reaction product of polyol components containing a lactone-based polyol and polyisocyanate components containing methylene diphenyl diisocyanate (MDI).

2. The roller base according to 1, wherein a carbonate-based polyol is contained as the polyol components, and equal to or greater than 30 parts by weight of the lactone-based polyol is contained with respect to 100 parts by weight of all the polyol components.

3. The roller base according to 1, wherein a polyether-based polyol is contained as the polyol components, and equal to or greater than 30 parts by weight of the lactone-based polyol is contained with respect to 100 parts by weight of all the polyol components.

4. A bill conveying roller comprising: the roller base according to any of 1 to 3.

Further, the invention also discloses the following inventions.

5. A bill conveying roller base including an elastic layer covering at least part of the outer peripheral surface, the elastic layer including a thermosetting polyurethane, in which a weight increase rate (oleic acid) after the thermosetting polyurethane in a sheet shape with a thickness of 2 mm is dipped into an oleic acid under conditions of room temperature for one week is equal to or less than 10.0%, and a weight increase rate (DOP) after the thermosetting polyurethane is dipped in dioctylphthalate (DOP) at the room temperature under similar conditions is equal to or less than 5.0%, and a breaking stress retention rate after the thermosetting polyurethane in a sheet state with a thickness of 2 mm is left for 2 weeks in a 70° C.×95% RH environment is equal to or greater than 90%.

6. The roller base according to 5, in which the weight increase rate (oleic acid) is equal to or less than 7.2%, or the weight increase rate (DOP) is equal to or less than 4.1%, and the breaking stress retention rate is equal to or greater than 95%.

7. A bill conveying roller including the roller base according to 5 or 6.

Advantageous Effects of Invention

The bill conveying roller base according to the invention has an excellent swelling resistance, and the diameter thereof hardly changes even when the roller base body is brought into contact with oil components. Since a bill transporting roller provided with the roller base according to the invention has excellent dimensional stability and can separate and convey an accurate number of bills, it is possible to achieve significantly high reliability that the bill feeding device is required to have. The bill transporting roller is disposed inside the bill feeding device and is used in an environment in which the temperature, the humidity, and the like significantly vary due to the season, the weather, and the like. The roller base according to the invention has excellent hydrolysis resistance and has a stable elasticity, strength, a friction coefficient, and the like of the elastic layer even when the roller base is used in a high-humidity environment. Therefore, the bill conveying roller provided with the roller base according to the invention has a long product lifetime, a reduced replacement frequency, and reduced maintenance costs.

REFERENCE SIGNS LIST

1 Bill conveying roller
11 Roller base
110 Elastic body
111 Tubular body
12 Shaft

DESCRIPTION OF EMBODIMENTS

"Bill Conveying Roller"

Figure 1:
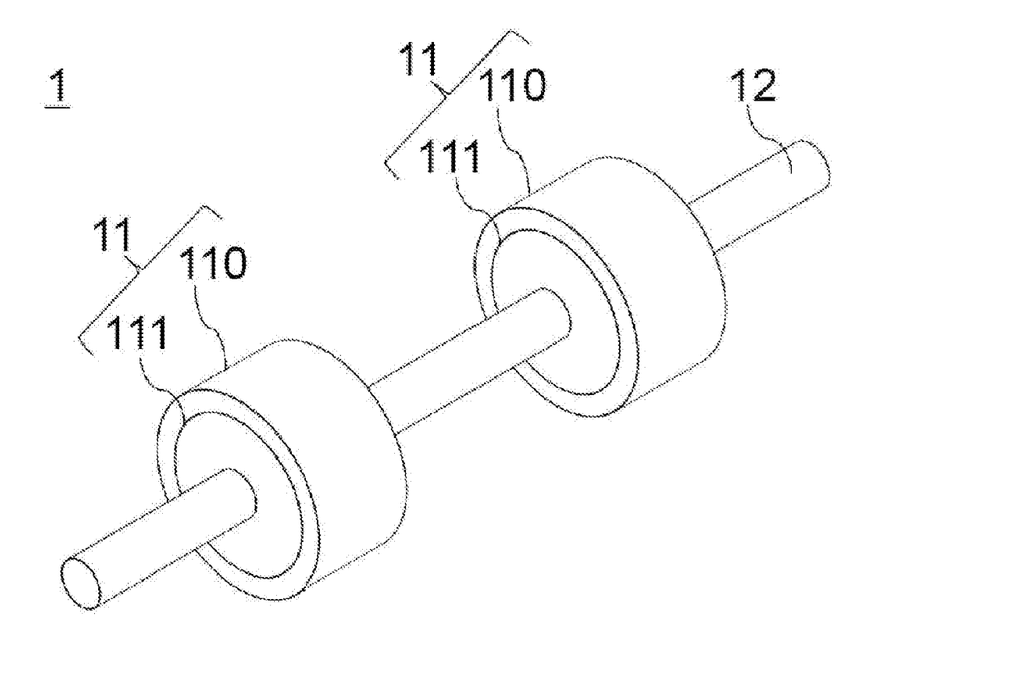
FIG. 1 is a diagram illustrating an embodiment of a bill conveying roller according to the invention.

FIG. 1 illustrates an embodiment of a bill conveying roller.

A bill conveying roller 1 according to an embodiment has a roller base 11 and a shaft 12. The roller base 11 has a tubular body 111 provided with a shaft hole into which the shaft 12 is inserted and an elastic layer 110 that covers at least a part of an outer peripheral surface of the tubular body.

Note that the roller base and the bill conveying roller according to the invention are not limited to the embodiment.

"Shaft"

The shaft 12 is a shaft that rotatably supports the bill conveying roller 1. It is possible to perform precision work on one end or both ends of the shaft 12 for engaging with a drive component such as a toothed belt. Also, the shaft 12 can rotatably support the bill conveying roller 1 by a slipping bearing and a ball bearing. Further, the shaft 12 can also be molded integrally with the tubular body 111 of the roller base.

A material that forms the shaft 12 is not particularly limited as long as the material has electrical conductivity, and metal is preferably used. As the metal, iron, copper, an aluminum alloy, stainless steel, nickel, or the like is preferably used, for example. Also, it is possible to use a material obtained by performing plating processing thereon by a method such as hot-dip plating, electrolytic plating, or non-electrolytic plating.

"Roller Base"

The roller base 11 has the tubular body 111 and the elastic layer 110 that covers at least a part of the outer peripheral surface of the tubular body 111.

As a material that forms the tubular body 111, a polyacetal, ultra-high molecular weight polyethylene, polypropylene, nylon, acrylonitrile-1,3-butadiene-styrene copolymer, polybutylene terephthalate, polyphenylene sulfide, polycarbonate, polystyrene, polyether ether ketone, polyamideimide, polyimide, polyvinyl chloride, acryl, modified polyphenylene ether, polysulfone, or the like can be used.

The elastic layer 110 is made of thermosetting polyurethane that is a reaction product of polyol components containing a lactone-based polyol and polyisocyanate components containing diphenylmethane diisocyanate (MDI).

In the roller base according to the invention, it is only necessary for the elastic layer to cover at least a part of the roller base, but the elastic layer may cover the entire surface thereof.

"Polyol"

The thermosetting polyurethane forming the elastic layer 110 is characterized by containing a lactone-based polyol as a polyol.

The lactone-based polyol is obtained by causing a lactone compound selected from a β-propiolactone, γ-butyrolactone, δ-valerolactone, ε-caprolactone, β-methyl-δ-valerolactone, and the like to cause a ring-opening reaction using, as an initiator, a diol compound selected from ethylene glycol, propylene glycol, 1,3-propylene glycol, 1,3-butanediol, 1,4-butanediol, 1,5-pentanediol, 3-methyl-1,5-pentanediol, neopentyl glycol, diethylene glycol, 4-oxa-2,6-heptanediol, 4-oxaheptane-1,7-diol, 1,10-decanediol and the like. Two or more kinds of lactone compounds can also be mixed and used.

As the lactone-based polyol, a polycaprolactone polyol using ε-caprolactone as the lactone compound is preferably used due to it being difficult to hydrolyze.

The number average molecular weight of the lactone-based polyol is preferably equal to or greater than 500 and equal to or less than 4000. If the number average molecular weight of the lactone-based polyol is less than 500, properties at a low temperature becomes poor. If the number average molecular weight of the lactone-based polyol is greater than 4000, viscosity becomes excessively high, operability becomes poor, it becomes difficult to mix uniformly with the polyisocyanate, and the permanent strain is deteriorated.

As a polyol, it is also possible to include a carbonate-based polyol or a polyether-based polyol.

The carbonate-based polyol is obtained by causing a diol compound selected from ethylene glycol, 1,3-propanediol, 1,4-butanediol, 1,5-pentanediol, 1,6-hexanediol, 2-methyl-1,5-pentanediol, 3-methyl-1,5-pentanediol, neopentyl glycol, diethylene glycol, and the like to undergo a condensation reaction with a diester carbonate compound selected from dimethyl carbonate, diethyl carbonate, diphenyl carbonate, ethylene carbonate, trimethylene carbonate, tetramethylene carbonate, and the like. Two or more kinds of diol compounds can also be used.

As the carbonate-based polyol, a condensation reaction product of one or both of 1,4-butanediol and 1,6-hexanediol as diol compounds with one of diethyl carbonate, diphenyl carbonate, and ethylene carbonate as a diester carbonate compound is preferably used due to its highly crystalline nature and excellent swelling resistance.

Examples of the polyether-based polyol include polyalkylene glycols such as polyethylene glycol, polypropylene glycol, polypropylene triol, polytetramethylene glycol, polypropylene tetraol, polytetramethylene triol, and copolymers thereof, and derivatives, and modified substances thereof, and the like obtained by introducing one or both of a side chain and a branched structure to these substances. Substances obtained by a ring-opening addition reaction of an alkylene oxide such as ethylene oxide, propylene oxide, 1,2-butylene oxide, 1,3-butylene oxide, styrene oxide, or the like using, as a starting material, a compound having two or more active hydrogen-containing groups can be employed. Two or more kinds of alkylene oxide can also be used.

A polyether-based polyol is preferably used since then the mechanical strength of polytetramethylene ether glycol becomes high.

The number average molecular weight of the carbonate-based polyol and the polyether-based polyol is preferably equal to or greater than 500 and equal to or less than 3000. If the number average molecular weight of the carbonate-based polyol and the polyether-based polyol is less than 500, properties at a low temperature becomes poor. If the number average molecular weight of the carbonate-based polyol and the polyether-based polyol is greater than 3000, viscosity becomes excessively high and operability becomes poor, it results in difficulty in mixing uniformly with the polyisocyanate, and deterioration of permanent strain.

The polyol used in the invention preferably contains equal to or greater than 30 parts by weight of lactone-based polyol, more preferably contains equal to or greater than 40 parts by weight of lactone-based polyol, further preferably contains equal to or greater than 55 parts by weight of lactone-based polyol, and most preferably contains equal to or greater than 70 parts by weight of lactone-based polyol with respect to 100 parts by weight of all the polyol components. Note that although a polyether-based polyol has an inferior swelling resistance, the swelling resistance is improved by containing equal to or greater than 30 parts by weight of lactone-based polyol, and it is possible to achieve a product lifetime required for the bill conveying roller.

"Polyisocyanate"

The thermosetting polyurethane forming the elastic layer 110 is characterized by containing diphenyl methane diisocyanate (MDI) as a polyisocyanate. With diphenyl methane diisocyanate, it is possible to obtain a thermosetting polyurethane with excellent cohesive properties and excellent swelling resistance.

As for MDI, isomers such as 2,2'-MDI, 2,4'-MDI, and 4,4'-MDI are present. Since the hardness of 2,2'-MDI and 2,4'-MDI is lower than that of 4,4'-MDI, equal to or greater than 50% by weight of 4,4'-MDI is preferably contained with respect to the entire amount of MDI. The content of 4,4'-MDI is preferably equal to or greater than 80% by weight, is further preferably equal to or greater than 90%, and most preferably equal to or greater than 95% by weight with respect to the entire amount of MDI.

Further, it is possible to use other isocyanate compounds than diphenyl methane diisocyanate as polyisocyanate in the invention to the extent that the effects of the invention are not diminished.

"Thermosetting Polyurethane"

The thermosetting polyurethane forming the elastic layer 110 can be obtained by thermally curing a material composition that contains polyols containing the aforementioned lactone-based polyol and polyisocyanates containing the aforementioned diphenyl methane diisocyanate. It is possible to blend in a curing agent for thermally curing the material composition.

Also, a urethane pre-polymer may be obtained by causing a polyol and a polyisocyanate to react with each other in advance, and then the pre-polymer may be caused to react with the curing agent. When the urethane pre-polymer is synthesized, a polyol and a polyisocyanate are preferably blended in such that an NCO index value (isocyanate group/active hydrogen group) that is a molar equivalent ratio between the isocyanate groups of the polyisocyanate and the active hydrogen groups of the polyol falls within a range of equal to or greater than 1.0 and equal to or less than 1.2.

The curing agent to be blended in when the thermal curing is caused is not particularly limited, and examples thereof include: aliphatic bivalent alcohols such as ethylene glycol, 1,2-propanediol, 1,3-propanediol, 2-methyl-1,3-propanediol, 2-butyl-2-ethyl-1,3-propanediol, 1,3-butanediol, 1,4-butanediol, neopentyl glycol (2,2-dimethyl-1,3-propanediol), 2-isopropyl-1,4-butanediol, 3-methyl-2,4-pentandiol, 2,4-pentanediol, 1,5-pentanediol, 3-methyl-1,5-pentanediol, 2-methyl-2,4-pentanediol, 2,4-dimethyl-1,5-pentanediol, 2,4-diethyl-1,5-pentanediol, 1,5-hexanediol, 1,6-hexanediol, 2-ethyl-1,3-hexanediol, 2-ethyl-1,6-hexanediol, 1,7-heptanediol, 3,5-heptanediol, 1,8-octanediol, 2-methyl-1,8-octanediol, 1,9-nonanediol, and 1,10-decanediol; alicyclic bivalent alcohols such as cyclohexanedimethanol (for example, 1,4-cyclohexanedimethanol), cyclohexanediol (for example, 1,3-cyclohexanediol, 1,4-cyclohexanediol), and 2-bis(4-hydroxycyclohexyl)-propane; trivalent or higher polyvalent alcohols such as trimethylolethane, trimethylolpropane, hexitols, pentitols, glycerin, polyglycerin, 1,2,6-hexanetriol, 1,2,4-butanetriol, sorbitol, pentaerythritol, and dipentaerythritol tetramethylolpropane; bivalent amines such as ethylenediamine, diaminobutane, trimethylhexamethylenediamine, p-phenylenediamine, 3,3'-dichloro-4,4'-diaminodiphenylmethane, and 4,4'-diaminodiphenylmethane; polyvalent amines such as triethylenetetramine and diethylenetriamine; amino polyvalent alcohols such as triethanolamine, triisopropanolamine, and diisopropanolamine; and polyvalent alcohols obtained by causing an alkylene oxide such as ethylene oxide or propylene oxide or a mixture thereof to cause ring-opening polymerization using a polyvalent alcohol or a polyvalent amino alcohol as an initiator.

Among these, it is preferable to use a bivalent alcohol alone or to use a bivalent alcohol and a trivalent alcohol in combination, and it is more preferable to use a combination of 1,4-butanediol and trimethylolpropane. However, since mechanical properties of the obtained thermosetting polyurethane deteriorates if the amount of the trivalent alcohol is large, the content of the trivalent alcohol is preferably equal to or less than 15 mol %, is more preferably equal to or greater than 0.1 mol % and equal to or less than 7 mol %, and is further preferably equal to or greater than 1 mol % and equal to or less than 3 mol % with respect to the total amount of the bivalent alcohol and the trivalent alcohol.

Such a curing agent is blended in such that a molar ratio between the isocyanate groups of the aforementioned polyisocyanate and the active hydrogen groups that polyol and the curing agent have is equal to or greater than 1.0 and equal to or less than 1.2. Also, when the curing agent is blended into a urethane pre-polymer, the curing agent is blended in such that a molar ratio between the isocyanate groups of the urethane pre-polymer and the active hydrogen group that the curing agent has is equal to or greater than 1.0 and equal to or less than 1.5.

Further, a catalyst can be used to promote the curing reaction. The catalyst is not particularly limited as long as the catalyst promotes urethane formation between a hydroxyl group and an isocyanate group, and examples thereof that can be used include: trialkylamines such as triethylamine; tetraalkyldiamines such as N,N,N',N'-tetramethyl-1,3-butanediamine; aminoalcohols such as dimethylethanolamine; ethoxylated amines; ethoxylated diamines; ester amines such as bis(diethylethanolamine) adipate; triethylenediamine; cyclohexylamine derivatives such as N,N-dimethylcyclohexylamine; morpholine derivatives such as N-methylmorpholine, N-(2-hydroxypropyl)-dimethylmorpholine; amine compounds such as piperazine derivatives such as N,N'-diethyl-2-methylpiperazine, and N,N'-bis-(2-hydroxypropyl)-2-methylpiperazine; dialkyl tin compounds such as dibutyltin dilaurate, and dibutyltin di(2-ethylhexoate); organic tin compounds such as tin (I) 2-ethyl caproic acid and tin (I) oleic acid; saturated fatty acid alkali metal salts that are salts of saturated fatty acids such as a formic acid, an acetic acid, propionic acid, a butyric acid, a valeic acid, a caproic acid, an enanthic acid, a caprylic acid, a pelargonic acid, a capric acid, a lauric acid, a myristic acid, a pentadecyl acid, a palmitic acid, a margaric acid, or a stearic acid with an alkali metal such as lithium, sodium, potassium, rubidium, cesium, and francium; metal carboxylates that are salts of a carboxylic acid such as 2-hexanoic acid or neodecane and metal such as lithium, zinc, bismuth, or calcium; a temperature-sensitive catalyst such as diazabicyclononene (DBN), diazabicycloundecene (DBU), phenol resin salts thereof, octoates, stearates, oleates, formates, or p-toluene sulfonates. Among these, organic tin compounds and metal carboxylates are preferably used since it is then possible to obtain a reaction promoting effect with a small amount of addition thereof, and also, the temperature-sensitive catalysts are preferably used in terms of a long pot life.

"Other Components"

Into the urethane resin composition forming the thermosetting polyurethane, it is possible to blend additives such as a filler, a stabilizer, a reaction promoting catalyst, a softener, a working aid, a release agent, a defoaming agent, and a flame retardant as needed.

The hardness (type A) of the thermosetting polyurethane forming the elastic layer according to the invention is preferably equal to or greater than 30 and equal to or less than 95 due to its excellent gripping force against bills.

In the invention, the elastic layer that covers at least a part of the outer peripheral surface is formed of the thermosetting polyurethane obtained by thermally curing the material composition with the aforementioned specific composition and has excellent swelling resistance, hydrolysis resistance, and abrasion resistance.

As the swelling resistance of the thermosetting polyurethane forming the elastic layer according to the invention, the weight increase rate (oleic acid) after the elastic layer in a sheet state with a thickness of 2 mm is dipped in an oleic acid that is a main component of sebum at room temperature for one week is equal to or less than 10.0%, or the weight increase rate (DOP) after the elastic layer is dipped in dioctyl phthalate (DOP) that is typically used as a plasticizer for a print ink under similar conditions is equal to or less than 5.0%. The weight increase rate (oleic acid) is preferably equal to or less than 7.2%, and the weight increase rate (DOP) is preferably equal to or less than 4.1%.

As the hydrolysis resistance of the thermosetting polyurethane forming the elastic layer according to the invention, the fracture strength retention rate after the elastic layer in the state of the sheet with a thickness of 2 mm is held in an environment at a temperature of 70° C. and a humidity of 95% RH for two weeks is equal to or greater than 90%. The fracture strength retention rate is preferably equal to or greater than 95%.

As the abrasion resistance of the thermosetting polyurethane forming the elastic layer according to the invention, the weight after the sheet with a thickness of 2 mm is pressed against a disc that is made of an FC material (cast iron) and rotates at a rotation frequency of 48 rpm with a load of 1.0 kg for 3 hours is maintained by equal to or greater than 99% as compared with the initial weight.

"Method of Manufacturing Roller Base"

The roller base 11 according to the invention can be manufactured by placing the tubular body 111 at the center of a cylindrical mold frame, pouring a material composition into a cavity formed between the mold frame and the tubular body, and thermally curing the material composition, thereby obtaining the elastic layer 110 made of the thermosetting polyurethane. Conditions for the thermal curing ordinarily include a temperature of equal to or greater than 70° C. and equal to or less than 150° C. and a time of equal to or greater than 5 minutes and equal to or less than 120 minutes.

A method of molding the roller base 11 may be any of a one-shot method, a prepolymer method, and a pseudo prepolymer method.

In the one-shot method, polyol, polyisocyanate, a curing agent, a catalyst, and the like are poured and hardened at once, thereby producing a molded article of the thermosetting polyurethane.

In the prepolymer method, polyol and a stoichiometrily excessive amount of polyisocyanate are caused to react with each other to prepare a prepolymer having an isocyanate group at a terminal in advance, prescribed amounts of curing agent, catalyst, and the like are mixed therein, and the prepolymer is cured, thereby producing a molded article of the thermosetting polyurethane.

In the pseudo prepolymer method, a part of polyol is mixed into a curing agent in advance, a prepolymer is prepared using the remaining polyol and polyisocyanate, and the mixture of polyol, the curing agent, the catalyst, and the like mixed in advance is mixed therein and is then hardened thereby producing a molded article of the thermosetting polyurethane.

In a case in which a lactone-based polyol and carbonate-based polyol or a polyether-based polyol are used as polyols, it is possible to preferably use the pseudo prepolymer method of causing either one of the polyols to react with polyisocyanate to obtain a prepolymer and then thermally curing the prepolymer with the other polyol.

The bill conveying roller base according to the invention can prevent swelling due to oil components adhering to bills by the elastic layer that covers at least a part of the outer peripheral surface being made of the thermosetting polyurethane with the aforementioned specific composition. Also, it is possible to achieve properties such as dimensional stability, durability, compression permanent strain, and the like required for the bill conveying roller base. Therefore, the bill conveying roller used in the roller base according to the invention has excellent reliability and durability and can reduce troubles such as paper jam. Also, it is possible to reduce a replacement frequency and thereby to reduce maintenance cost.

EXAMPLES

Example 1

100 parts by weight of 4,4-diphenylmethanediisocyanate (Millionate MT manufactured by Tosoh Corporation) and 122 parts of polycaprolactone polyol (Praccel 220 manufactured by Daicel Corporation) were weighed and stirred and mixed in a nitrogen atmosphere at 80° C. for 4 hours, thereby obtaining a prepolymer. 100 parts by weight of MDI-PCL prepolymer obtained through synthesis, 22.5 parts by weight of polycaprolactone polyol (Praccel 220 manufactured by Daicel Corporation), 10.9 parts by weight of 1,4-butanediol, and 0.3 parts by weight of 1,1,1-trimethylolpropane were weighed and stirred and mixed using a reciprocating rotation-type stirrer Agitor for 2 minutes, the mixture was poured between metal plates with a 2 mm spacer interposed therebetween, crosslinking curing was caused under conditions of a furnace temperature of 120° C. and a furnace time of 90 minutes, and crosslinking was then caused in a furnace adjusted to 120° C. for 12 hours, thereby obtaining a sheet-shaped substance 1 with a thickness of 2 mm.

Example 2

100 parts by weight of 4,4-diphenylmethanediisocyanate (Millionate MT) and 122 parts of polycaprolactone polyol (Praccel 220) were weighed and stirred and mixed in a nitrogen atmosphere at 80° C. for 4 hours, thereby obtaining a prepolymer. 100 parts by weight of MDI-PCL prepolymer obtained through synthesis, 22.5 parts by weight of polycarbonate polyol (Nipporane 980R manufactured by Tosoh Corporation), 10.9 parts by weight of 1,4-butanediol, and 0.3 parts by weight of 1,1,1-trimethylolpropane were weighed and stirred and mixed using a reciprocating rotation-type stirrer Agitor for 2 minutes, the mixture was poured between metal plates with a 2 mm spacer interposed therebetween, crosslinking curing was caused under conditions of a furnace temperature of 120° C. and a furnace time of 90 minutes, and crosslinking was then caused in a furnace adjusted to 120° C. for 12 hours, thereby obtaining a sheet-shaped substance 2 with a thickness of 2 mm.

Example 3

100 parts by weight of 4,4-diphenylmethanediisocyanate (Millionate MT) and 122 parts of polytetramethylene ether glycol (PTG2000SN manufactured by Hodogaya Chemical Co., Ltd.) were weighed and stirred and mixed in a nitrogen atmosphere at 80° C. for 4 hours, thereby obtaining a prepolymer. 100 parts by weight of MDI-PTMG prepolymer obtained through synthesis, 22.5 parts by weight of polycaprolactone polyol (Praccel 220), 10.9 parts by weight of 1,4-butanediol, and 0.3 parts by weight of 1,1,1-trimethylolpropane were weighed and stirred and mixed using a reciprocating rotation-type stirrer Agitor for 2 minutes, the mixture was poured between metal plates with a 2 mm spacer interposed therebetween, crosslinking curing was caused under conditions of a furnace temperature of 120° C. and a furnace time of 90 minutes, and crosslinking was then caused in a furnace adjusted to 120° C. for 12 hours, thereby obtaining a sheet-shaped substance 3 with a thickness of 2 mm.

Comparative Example 1

100 parts by weight of TDI-PTMG prepolymer (Takenate L-80 manufactured by Mitsui Chemicals, Inc.) and 12.7 parts by weight of 4,4'-methylene bis(2-chloroaniline) were weighed and stirred and mixed for 2 minutes using a reciprocating rotation-type stirrer Agitor, the mixture was poured between metal plates with a 2 mm spacer interposed therebetween, crosslinking curing was caused under conditions of a furnace temperature of 100° C. and a furnace time of 90 minutes, and crosslinking was thus caused in a furnace adjusted to 120° C. for 12 hours, thereby obtaining a sheet-shaped substance 4 with a thickness of 2 mm.

Comparative Example 2

100 parts by weight of TDI-PCL prepolymer (Takenate L-1390 manufactured by Mitsui Chemicals, Inc.) and 13.2 parts by weight of 4,4'-methylene bis(2-chloroaniline) were weighed and stirred and mixed for 2 minutes using a reciprocating rotation-type stirrer Agitor, the mixture was poured between metal plates with a 2 mm spacer interposed therebetween, crosslinking curing was caused under conditions of a furnace temperature of 100° C. and a furnace time of 90 minutes, and crosslinking was then caused in a furnace adjusted to 120° C. for 12 hours, thereby obtaining a sheet-shaped substance 5 with a thickness of 2 mm.

Comparative Example 3

100 parts by weight of TDI-PCL prepolymer (Takenate L-1395 manufactured by Mitsui Chemicals, Inc.), 21.6 parts by weight of polycarbonate polyol (Nipporane 980R), and 16.1 parts by weight of 4,4'-methylene bis(2-chloroaniline) were weighed and stirred and mixed for 2 minutes using a reciprocating rotation-type stirrer Agitor, the mixture was poured between metal plates with a 2 mm spacer interposed therebetween, crosslinking curing was caused under conditions of a furnace temperature of 100° C. and a furnace time of 90 minutes, and crosslinking was then caused in a furnace adjusted to 120° C. for 12 hours, thereby obtaining a sheet-shaped substance 6 with a thickness of 2 mm.

Comparative Example 4

100 parts by weight of TDI-PTMG prepolymer (Takenate L-2761 manufactured by Mitsui Chemicals, Inc.), 20.4 parts by weight of polycaprolactone polyol (Praccel 220), and 14.5 parts by weight of 4,4'-methylene bis(2-chloroaniline) were weighed and stirred and mixed for 2 minutes using a reciprocating rotation-type stirrer Agitor, the mixture was poured between metal plates with a 2 mm spacer interposed therebetween, crosslinking curing was caused under conditions of a furnace temperature of 100° C. and a furnace time of 90 minutes, and crosslinking was then caused in a furnace adjusted to 120° C. for 12 hours, thereby obtaining a sheet-shaped substance 7 with a thickness of 2 mm.

Comparative Example 5

100 parts by weight of TDI-PTMG prepolymer (Takenate L-2761), 20.6 parts by weight of polycarbonate polyol (Nipporane 980R), and 14.5 parts by weight of 4,4'-methylene bis(2-chloroaniline) were weighed and stirred and mixed for 2 minutes using a reciprocating rotation-type stirrer Agitor, the mixture was poured between metal plates with a 2 mm spacer interposed therebetween, crosslinking curing was caused under conditions of a furnace temperature of 100° C. and a furnace time of 90 minutes, and crosslinking was then caused in a furnace adjusted to 120° C. for 12 hours, thereby obtaining a sheet-shaped substance 8 with a thickness of 2 mm.

Comparative Example 6

100 parts by weight of ester polyol (Takerac U-6230 manufactured by Mitsui Chemicals, Inc.), 31.9 parts by weight of prepolymer (Takkenate LSI-990 manufactured by Mitsui Chemicals, Inc.), 13 parts by weight of 1,4-bis(β-hydroxyethoxy)benzene as a chain extender, and 0.5 parts by weight of 1,1,1-trimethylolpropane were weighed and stirred and mixed for 2 minutes using a reciprocating rotation-type stirrer Agitor, the mixture was poured between metal plates with a 2 mm spacer interposed therebetween, crosslinking curing was caused under conditions of a furnace temperature of 140° C. and a furnace time of 90 minutes, and crosslinking was then caused in a furnace adjusted to 110° C. for 12 hours, thereby obtaining a sheet-shaped substance 9 with a thickness of 2 mm.

Comparative Example 7

100 parts by weight of ester polyol (Takerac U-6230 manufactured by Mitsui Chemicals, Inc.), 31.9 parts by weight of prepolymer (Takenate LSI-990 manufactured by Mitsui Chemicals, Inc.), 13 parts by weight of 1,4-bis(β-hydroxyethoxy)benzene as a chain extender, 0.5 parts by weight of 1,1,1-trimethylolpropane, 1 parts by weight of a hydrolysis stabilizer (product name: Stabaxol ILF manufactured by Rhein Chemie Japan) were weighed and stirred and mixed for 2 minutes using a reciprocating rotation-type stirrer Agitor, the mixture was poured between metal plates with a 2 mm spacer interposed therebetween, crosslinking curing was caused under conditions of a furnace temperature of 140° C. and a furnace time of 90 minutes, and crosslinking was then caused in a furnace adjusted to 110° C. for 12 hours, thereby obtaining a sheet-shaped substance 10 with a thickness of 2 mm.

Comparative Example 8

100 parts by weight of 4,4-diphenylmethanediisocyanate (Millionate MT) and 122 parts by weight of polytetramethylene ether glycol (PTG2000SN) were weighed and stirred and mixed for 4 hours in a nitrogen atmosphere at 80° C., thereby obtaining a prepolymer. 100 parts by weight of MDI-PTMG prepolymer obtained through synthesis, 46.5 parts by weight of polyether polyol (PTG2000SN), 13.0 parts by weight of 1,4-butanediol, and 0.4 parts by weight of 1,1,1-trimethylolpropane were weighed and stirred and mixed for 2 minutes using a reciprocating rotation-type stirrer Agitor, the mixture was poured between metal plates with a 2 mm spacer interposed therebetween, crosslinking curing was caused under conditions of a furnace temperature of 120° C. and a furnace time of 90 minutes, and crosslinking was caused in a furnace adjusted to 120° C. for 12 hours, thereby obtaining a sheet-shaped substance 11 with a thickness of 2 mm.

"Physical Property Evaluation"

Swelling Test

The sheet-shaped substances 1 to 11 obtained in the aforementioned examples, the weights of which were measured in advance, were dipped in an oleic acid or DOP at room temperature for 1 week.

After the sheet-shaped substances were dipped for 1 week, the sheet-shaped substances were taken out, the surfaces thereof were wiped with Bemcott (manufactured by Asahi Kasei Corporation), and the weight increase rates (%) were obtained by the following formula:

Weight increase rate (%)=(weight after swelling–initial weight)/initial weight×100

Also, swelling resistance was evaluated with the following criteria on the basis of comparison of the weight increase rates between the sheet-shaped substance 4 that was the composition in Comparative Example 1 that was a currently available product with the other sheet-shaped substances.

⊚: The weight increase rate was less than 55% with respect to the value in Comparative Example 1.
◯: The weight increase rate was equal to or greater than 55% and less than 70% with respect to the value in Comparative Example 1.
Δ: The weight increase rate was equal to or greater than 70% and less than 85% with respect to the value in Comparative Example 1.
X: The weight increase rate was equal to or greater than 85% with respect to the value in Comparative Example 1.

The respective measurement values are shown in Table 1 below.

Hydrolysis Test

Hardness (type A) of the sheet-shaped substances 1 to 11 obtained in the aforementioned examples was measured using a micro-rubber hardness tester (manufactured by Kobunshi Keiki Co., Ltd.; device name: MD-1). Also, test pieces with JIS No. 3 dumbbell shapes were cut out from the sheets, and a tensile test was conducted at a tensile speed of 500 mm/min (manufactured by Instron; device name: electromechanical universal tester 3356).

The sheet-shaped substances 1 to 11 obtained in the aforementioned examples were left in an environment of 70° C.×95% RH (HH environment) for 2 weeks and were then left in an environment at room temperature (20° C.×45% RH) for 12 hours, and hardness measurement and a tensile test were similarly conducted.

Hardness retention rates (%) and breaking stress retention rates (%) were obtained by dividing the hardness and the fracture stress after the sheet-shaped substances were left in the HH environment by the values before the sheet-shaped substances were left.

Hydrolysis resistance (hardness retention rates) was evaluated with the following criteria from comparison of ratios of the hardness retention rates between the sheet-shaped substance 4 that was a composition in Comparative Example 1 that was a currently available product and the other sheet-shaped substances.

⊚: The hardness retention rate was equal to or greater than 95% with respect to the value in Comparative Example 1.
◯: The hardness retention rate was equal to or greater than 90% and less than 95% with respect to the value in Comparative Example 1.
Δ: The hardness retention rate was equal to or greater than 80% and less than 90% with respect to the value in Comparative Example 1.
X: The hardness retention rate was less than 80% with respect to the value in Comparative Example 1.

Hydrolysis resistance (breaking stress retention rates) was evaluated with the following criteria from comparison of the breaking stress retention rates between the sheet-shaped substance 4 that was a composition in Comparative Example 1 that was a currently available product with the other sheet-shaped substances.

⊚: The breaking stress retention rate was equal to or greater than 95% with respect to the value in Comparative Example 1.
◯: The breaking stress retention rate was equal to or greater than 90% and less than 95% with respect to the value in Comparative Example 1.
Δ: The breaking stress retention rate was equal to or greater than 80% and less than 90% with respect to the value in Comparative Example 1.
X: The breaking stress retention rate was less than 80% with respect to the value in Comparative Example 1.

The respective measurement results are shown in Table 1 below.

TABLE 1

|  |  | Example 1 | Example 2 | Example 3 |
|---|---|---|---|---|
| Swelling properties (weight increase rate) | DOP | 3.2 | 2.6 | 4.1 |
|  | Oleic acid | 4.0 | 3.3 | 7.2 |
| Hydrolysis properties (preservation in 70° C. × 95% environment) | Hardness retention rate (%) | 98 | 100 | 100 |
|  | Breaking stress retention rate (%) | 99 | 101 | 95 |

TABLE 1-continued

|  |  | | | |
|---|---|---|---|---|
| *Swelling resistance (with reference to Comparative Example 1) | DOP | ◎ | ◎ | ◎ |
|  | Oleic acid | ◎ | ◎ | ◎ |
| Hydrolysis resistance (with reference to Comparative Example 1) | Hardness retention rate (%) | ○ | ○ | ○ |
|  | Breaking stress retention rate (%) | ◎ | ◎ | ◎ |
| Total determination |  | ○ | ○ | ○ |

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Swelling properties (weight increase rate) | DOP | 7.8 | 2.9 | 4.5 | 4.4 | 4.5 | 0.4 | 0.6 | 6.9 |
|  | Oleic acid | 18.6 | 3.7 | 4.6 | 10.7 | 5.2 | 0.5 | 0.5 | 18.4 |
| Hydrolysis properties (preservation in 70° C. × 95% environment) | Hardness retention rate (%) | 97 | 97 | 100 | 99 | 99 | 77 | 63 | 100 |
|  | Breaking stress retention rate (%) | 84 | 77 | 79 | 70 | 89 | 19 | 13 | 111 |
| *Swelling resistance (with reference to Comparative Example 1) | DOP | — | ◎ | Δ | Δ | Δ | ◎ | ◎ | X |
|  | Oleic acid | — | ◎ | ◎ | Δ | ◎ | ◎ | ◎ | X |
| Hydrolysis resistance (with reference to Comparative Example 1) | Hardness retention rate (%) | — | ○ | ○ | ○ | ○ | X | X | ○ |
|  | Breaking stress retention rate (%) | — | Δ | Δ | Δ | Δ | X | X | ◎ |
| Total determination |  | — | Δ | Δ | Δ | Δ | X | X | X |

CONCLUSION

Examples 1 to 3 provided thermosetting polyurethanes that were reaction products of polyol components containing lactone-based polyol and polyisocyanate components containing diphenylmethane diisocyanate (MDI), and more excellent swelling resistances and water resistances as compared with Comparative Example 1 that was a currently available product were achieved.

In Comparative Examples 2 to 5 in which the toluene diisocyanate (TDI) was used instead of diphenylmethane diisocyanate (MDI), inferior water resistances as compared with that in Comparative example that was a currently available product were achieved. Also, in Comparative Examples 3 to 5 in which polyol other than lactone-based polyol was contained, inferior swelling resistances as compared with that in Comparative Example 1 that was a currently available product were achieved.

In Comparative Examples 6 and 7 in which the ester polyol was used, more excellent swelling properties as compared with that in Comparative Example 1 that was a currently available product were achieved while water resistance thereof was significantly inferior to that in Comparative Example 1.

In Comparative Example 8 in which the polyether-based polyol was used, more excellent water resistance as compared with that in Comparative Example 1 that was a currently available product was achieved while swelling properties thereof were significantly inferior to that in Comparative Example 1.

The invention claimed is:

1. A bill conveying roller base, comprising:
   an elastic layer covering at least part of an outer peripheral surface, the elastic layer containing a thermosetting polyurethane which is a reaction production of polyol components containing a lactone-based polyol and polyisocyanate components containing methylene diphenyl diisocyanate (MDI), wherein the thermosetting polyurethane is a pouring type polyurethane,
   wherein a carbonate-based polyol is contained as the polyol components, and
   equal to or greater than 30 parts by weight of the lactone-based polyol is contained with respect to 100 parts by weight of all the polyol components.

2. The roller base according to claim 1, wherein the thermosetting polyurethane further comprises a curing agent,
   a molar equivalent ratio between isocyanate groups of the polyisocyanate components and active hydrogen groups of the polyol components and the curing agent falls within a range of equal to or greater than 1.0 and equal to or less than 1.2.

3. A bill conveying roller base, comprising:
   an elastic layer covering at least part of an outer peripheral surface, the elastic layer containing a thermosetting polyurethane which is a reaction production of polyol components containing a lactone-based polyol and polyisocyanate components containing methylene diphenyl diisocyanate (MDI), wherein the thermosetting polyurethane is a pouring type polyurethane,
   wherein a polyether-based polyol is contained as the polyol components, and
   equal to or greater than 30 parts by weight of the lactone-based polyol is contained with respect to 100 parts by weight of all the polyol components.

4. The roller base according to claim 3, wherein the thermosetting polyurethane further comprises a curing agent, a molar equivalent ratio between isocyanate groups of the polyisocyanate components and active hydrogen groups of the polyol components and the curing agent falls within a range of equal to or greater than 1.0 and equal to or less than 1.2.

5. A bill conveying roller, comprising:

a bill conveying roller base and a shaft, wherein the shaft supports the bill conveying roller base, the bill conveying roller base comprises:

an elastic layer covering at least part of an outer peripheral surface, the elastic layer containing a thermosetting polyurethane which is a reaction production of polyol components containing a lactone-based polyol and polyisocyanate components containing methylene diphenyl diisocyanate (MDI), wherein the thermosetting polyurethane is a pouring type polyurethane, wherein a carbonate-based polyol is contained as the polyol components, and equal to or greater than 30 parts by weight of the lactone-based polyol is contained with respect to 100 parts by weight of all the polyol components.

6. A bill conveying roller comprising:

a bill conveying roller base and a shaft, wherein the shaft supports the bill conveying roller base, the bill conveying roller base comprising:

an elastic layer covering at least part of an outer peripheral surface, the elastic layer containing a thermosetting polyurethane which is a reaction production of polyol components containing a lactone-based polyol and polyisocyanate components containing methylene diphenyl diisocyanate (MDI), wherein the thermosetting polyurethane is a pouring type polyurethane, wherein a polyether-based polyol is contained as the polyol components, and equal to or greater than 30 parts by weight of the lactone-based polyol is contained with respect to 100 parts by weight of all the polyol components.

* * * * *